United States Patent [19]

Heibel

[11] Patent Number: 5,427,442
[45] Date of Patent: Jun. 27, 1995

[54] BRAKE PRESSURE CONTROL METHOD AND APPARATUS, INCLUDING A BRAKE PRESSURE BOOSTER

[75] Inventor: Helmut Heibel, Moschheim, Germany

[73] Assignee: Lucas Industries public limited company, Solihull, United Kingdom

[21] Appl. No.: 213,968

[22] Filed: Mar. 16, 1994

[30] Foreign Application Priority Data

Mar. 26, 1993 [DE] Germany .................. 43 09 850.9

[51] Int. Cl.⁶ .................. B60T 13/24; B60T 13/68
[52] U.S. Cl. .................. 303/114.3; 303/113.4; 303/DIG. 4
[58] Field of Search .................. 303/10, 11, 97, 113.4, 303/114.1–114.3, DIG. 3, DIG. 4

[56] References Cited

U.S. PATENT DOCUMENTS

| | | | |
|---|---|---|---|
| 4,057,301 | 11/1977 | Foster . | |
| 4,678,243 | 7/1987 | Leiber | 303/113.4 |
| 4,919,493 | 4/1990 | Leiber | 303/113.4 X |
| 5,115,162 | 5/1992 | Leonard et al. | 303/DIG. 3 |
| 5,158,343 | 10/1992 | Reichelt et al. | 303/113.4 |
| 5,169,215 | 12/1992 | Takata | 303/113.4 |
| 5,178,441 | 1/1993 | Heibel et al. | 303/113.4 X |
| 5,261,730 | 11/1993 | Steiner et al. | 303/113.4 |
| 5,302,008 | 4/1994 | Miyake et al. | 303/113.4 X |
| 5,332,298 | 7/1994 | Fujioka | 303/113.4 X |
| 5,333,942 | 9/1994 | Peczkowski et al. | 303/113.4 X |

FOREIGN PATENT DOCUMENTS

| | | |
|---|---|---|
| 3325714A1 | 1/1985 | Germany . |
| 3325714C2 | 11/1985 | Germany . |
| 3611941A1 | 10/1987 | Germany . |
| 3943002A1 | 7/1991 | Germany . |
| 4028290C1 | 1/1992 | Germany . |
| 4034857A1 | 5/1992 | Germany . |
| 9202154 | 5/1992 | Germany . |
| 2127505 | 4/1984 | United Kingdom . |
| 1678670 | 9/1991 | U.S.S.R. .................. 303/113.4 |
| WO9324353 | 12/1993 | WIPO . |

*Primary Examiner*—Robert J. Oberleitner
*Assistant Examiner*—Alfred Muratori
*Attorney, Agent, or Firm*—Oblon, Spivak, McClelland, Maier & Neustadt

[57] ABSTRACT

In a motor vehicle brake system, a force increase gradient (Fv ped) at the brake pedal is determined and, in response thereto, the brake pressure is boosted in a manner which provides for successively associating respective threshold values (Fv max) with respective instantaneous force increase gradients (Fv ped) at the brake pedal during a braking operation. The instantaneous actual value of the force increase gradient (Fv ped) is compared with the respective threshold value (Fv max), and the brake pressure booster is controlled in response to the result of this comparison.

1 Claim, 3 Drawing Sheets

BRAKE PRESSURE CONTROL METHOD AND APPARATUS, INCLUDING A BRAKE PRESSURE BOOSTER

BACKGROUND OF THE INVENTION

1. Field of the Invention

The instant invention relates to a brake pressure boosting system for control of the brake pressure in a motor vehicle brake system equipped with an electronically adjustable brake pressure booster.

2. Discussion of the Background

DE 39 43 002 A1 discloses a motor vehicle brake system, including a brake pressure booster and comprising, in addition to the usual mechanical actuating valve of the brake pressure booster, an electrically controlled valve to effect adjustment of the brake pressure booster (and thus of the braking force) in response to control signals generated by a data processor. An electronically adjustable brake pressure booster is described also in DE-GM 92 02 154.

DE 33 25 714 specifies a device for retardation of motor vehicles. Here the vehicle to be slowed down is equipped with a distance alarm radar system. With this device, the driver receives a warning when a previously set safety distance is fallen short of. If the brake pedal is actuated, following such warning, the threshold values of distance and pressure at the pedal are detected and, thereupon, an energy storage brake is activated to support the brake application in accordance with the distance and the threshold values.

DE 40 28 290 C1 describes a method of shortening the distance to stop in critical driving situations. Here, an exceeding of a first threshold value of the velocity at which the brake pedal is actuated is the only criterion to cause automatic braking at which the brake pressure acting on the brakes corresponds to the optimum brake pressure under the circumstances.

Means are known in the art with which brake pressure boosters, e.g. of a type operating with differential pressures, are controllable by an additional, electromagnetically operated control valve in such a way that a brake pressure boost is effected which differs from the purely mechanically controlled brake pressure boosting, being effected in response to the electronic control commands for the electromagnetically operable control valve.

Behavioral studies of drivers driving vehicles that are equiped with ABS (antilock braking system) have demonstrated that erroneous reactions often occur unconsciously in critical driving situations (especially so-called panicky braking). It is true, the brake pedal very often is actuated quickly enough during the initial phase of a braking operation, yet many drivers hesitate to slam down the pedal with maximum force. With a great number of car drivers, this braking performance, which certainly is not the optimum, occurs for the following reasons:

During the initial phase of a braking operation, the hydraulic reactive force (counter-force) acting against the pressure of the brake pedal still is relatively small because it is being generated by the rising pressure in the brake system. Therefore, the driver readily increases the velocity of actuation at the beginning of a brake application process. However, the reactive force augments very fast in the course of the further pedal travel. For this reason it can be observed with a great many drivers that, on panicky braking, the pedal velocity drops again rather quickly after having reached the maximum. Therefore, normally, distance to come to a stop is given away with this course of pedal actuation.

SUMMARY OF THE INVENTION

It is the object of the invention to adjust the brake pressure booster in a brake pressure boosting system for control of the brake pressure in a motor vehicle brake system equipped with an electronically adjustable brake pressure booster by simple means such that optimum braking effect is obtained in panicky braking situations.

This object is met, in accordance with the invention, by the features described hereinafter.

Thus a brake pressure booster, known per se, is used to generate pressures at the vehicle brakes that are no longer determined exclusively by the force produced at the brake pedal by the driver of the vehicle, but instead by other criteria. More particularly, those are a comparison of the force increase gradient Fv ped at the brake pedal with a threshold value F max. If the force increase gradient at the brake pedal surpasses a threshold value Fv max, a braking operation is released automatically and a brake pressure is built up which is higher than the pressure that would result from the position of the brake pedal alone.

BRIEF DESCRIPTION OF THE DRAWINGS

The invention will be described further, by way of example, with reference to the accompanying drawings, in which.

DESCRIPTION OF THE PREFERRED EMBODIMENTS

Figure 1:
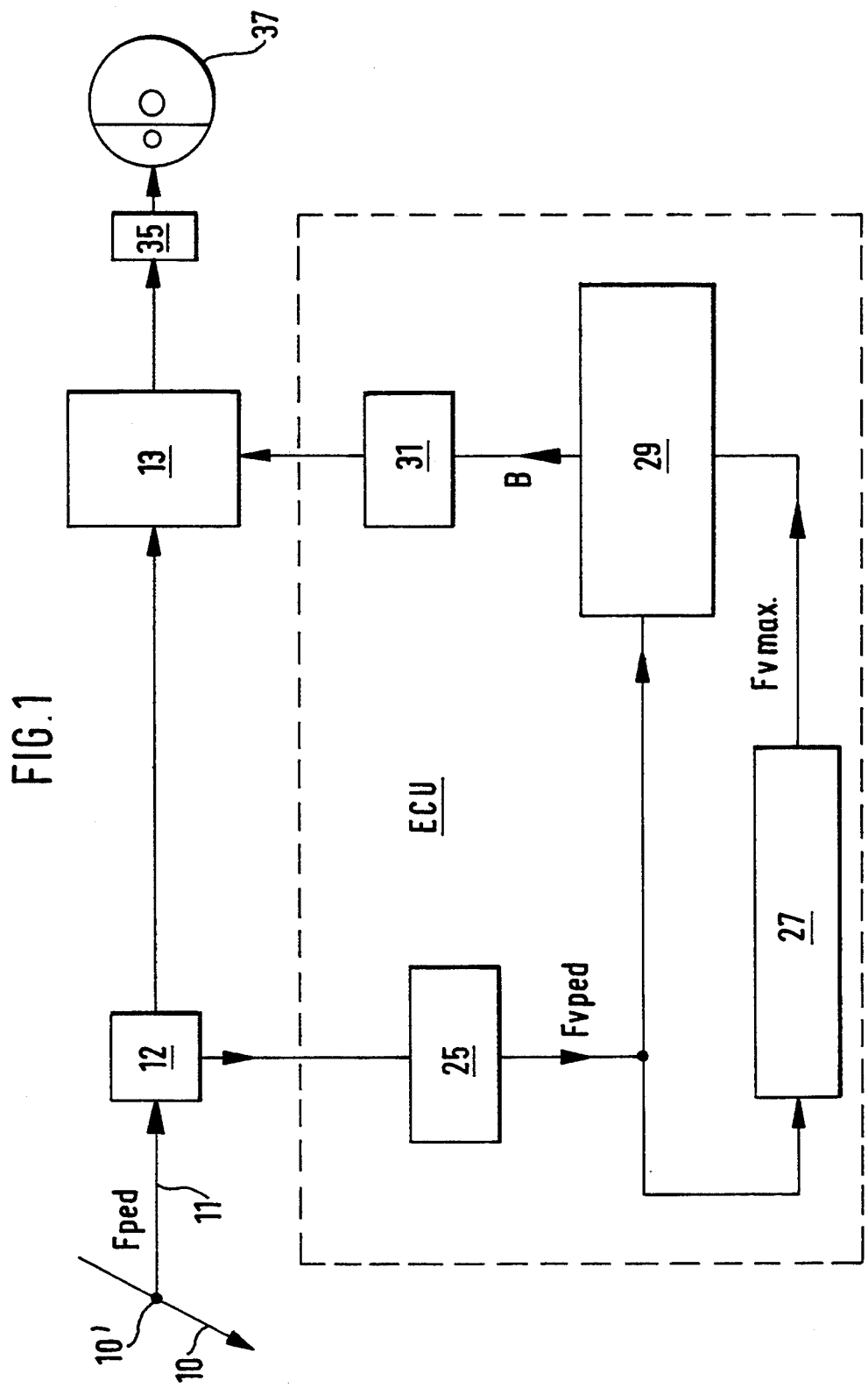
FIG. 1 is a logic block diagram of a brake system with which the method according to the invention can be realized.

A brake pedal 10 (see FIG. 1) is actuated by a driver, i.e. turned about a fulcrum 10'. A rod shaped actuator member 11 extends from the brake pedal 10 to a force sensor 12 which measures the force acting at the brake pedal 10.

The force sensor 12 preferably is disposed between the brake pedal 10 or its actuating rod and a brake pressure booster 13 in order to detect the actuating forces applied by the driver on the brake pedal 10.

What is decisive is that the force sensor 12 be located at a place at which the force it measures (and the course in time thereof) still conforms as best as possible to the force acting directly at the pedal 10. In other words, multiple deflections, transmissions, etc. of the force prior to measurement are to be avoided.

Figure 2:
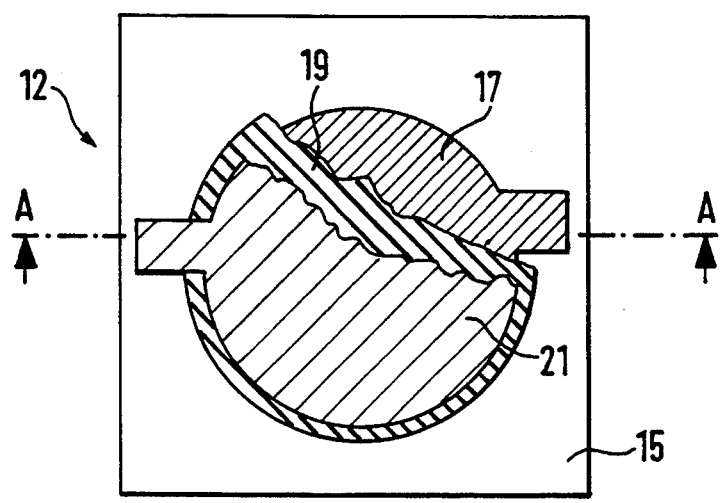
FIG. 2 is a top plan view, partly in section, of a force sensor.
Figure 2A:
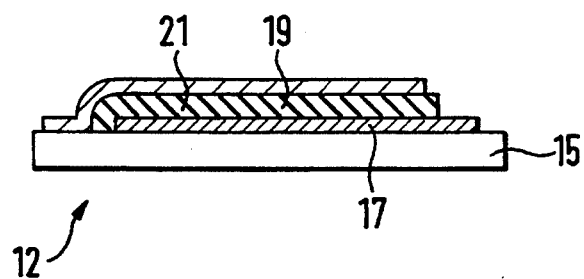
FIG. 2a shows the force sensor of FIG. 2 in side sectional elevation along line A—A of FIG. 2.

A suitable force sensor, for instance, is the sensor 12 which is illustrated in FIGS. 2, 2a and the structure of which is as follows:

A substrate 15 carries a first electrical contact layer 17 on top of which there is an electrical resistance layer 19 fully covering the first electrical contact layer 17. Another electrical contact layer 21 is disposed on the electrical resistance layer 19. The surface area dimensions of the second electrical contact layer 21 are no bigger than those of the first electrical contact layer 17.

The second electrical contact layer 21 is aligned above the first electrical contact layer 17.

A force sensor of this kind is specified in detail in the applicant's German patent application P 43 00 995.6 filed previously and published subsequently.

During a braking operation, the course in time of the force F ped acting at the brake pedal 10 is derivated (differentiated) in a calculator unit 25 in order to determine the increase in force at the pedal per unit time (Fv ped).

For the sake of simplicity, the rise of the force per unit time will be referred to below simply as the force increase gradient Fv ped at the brake pedal 10.

The force increase gradient Fv ped as determined by the calculator unit 25 is processed further in order to provide signals for control of the brake pressure booster 13. That is accomplished by constantly (successively) determining the respective instantaneous force increase gradient Fv ped at the brake pedal at very small time increments. And each instantaneous force increase gradient Fv ped is compared with a threshold value Fv max.

The threshold values Fv max are stored previously and predetermined for the brake system. (This does not mean that they are unalterable, yet they are firmly set for a particular braking operation.)

The respective instantaneous value of the force increase gradient Fv ped at the brake pedal 10 is determined in very small time increments of, for instance, a few milliseconds (2 to 10 ms) in the manner described above. And for each of these time increments, a threshold value Fv max, previously stored in a memory 27 for the corresponding vehicle, then is associated with the respective instantaneous value measured of the force increase gradient Fv ped.

As an alternative, a threshold value Fv max may be allocated by an algorithm to each instantaneous value of the force increase gradient Fv ped. In other words, in this event reference numeral 27 in FIG. 1 would designate an arithmetic routine for calculating respective threshold values F max for each of the force increase gradients Fv ped measured, as of the beginning of brake application, in sections of time in the millisecond range. This mathematical determination of the threshold value Fv max either can be linear (Fv max=a.t+b; a, b=const.) or it can be done according to a function of the threshold value Fv max in response to the time lapsed since the beginning of the braking event, the time t being raised to a higher power, specifically by applying an exponent of power greater than 1 (Fv max=d.t$^c$+e; c>1, e, d=const.).

The beginning of time t either is based on a signal derived from the stop light signal generator or (see FIG. 1) from a change in pedal velocity (Fv ped>0). There is yet another possibility, namely to divide the force increase gradient into individual sections (time windows) and determine characteristic magnitudes within these sections for comparison with threshold values Fv max from a look-up table or with values calculated according to certain equations.

This means that, for each time increment the corresponding threshold value Fv max is determined successively for the instantaneous force increase gradient Fv ped and input into a comparator 29.

In the comparator 29, each threshold value Fv max as determined is compared with the actual value of the force increase gradient Fv ped, and an output signal B depending on this comparison is applied to a brake pressure booster controller 31. This brake pressure booster controller 31 controls a brake pressure booster 13 which is arranged in per se known manner between the brake pedal 10 and a master cylinder 35. A brake 37 is connected in the usual way downstream of the master cylinder 35. The brake pressure booster controller 31, for instance, actuates a special, electromagnetically operable valve of the brake pressure booster in such manner that the hydraulic pressure generated in the brake 37 by the brake pressure booster 13 is raised in response to the result furnished by the comparator 29.

If the comparison between the threshold value Fv max and the actual value of the force increase gradient Fv ped reveals a higher value for Fv ped than the threshold value Fv max, the brake pressure booster controller 31 provides a signal which causes the brake pressure booster 13 to intensify its brake pressure reinforcing effect. On the other hand, if the comparison shows that the actual value of Fv ped is smaller than the threshold value Fv max, no adjustment will be made of the brake pressure booster 13.

Figure 3:
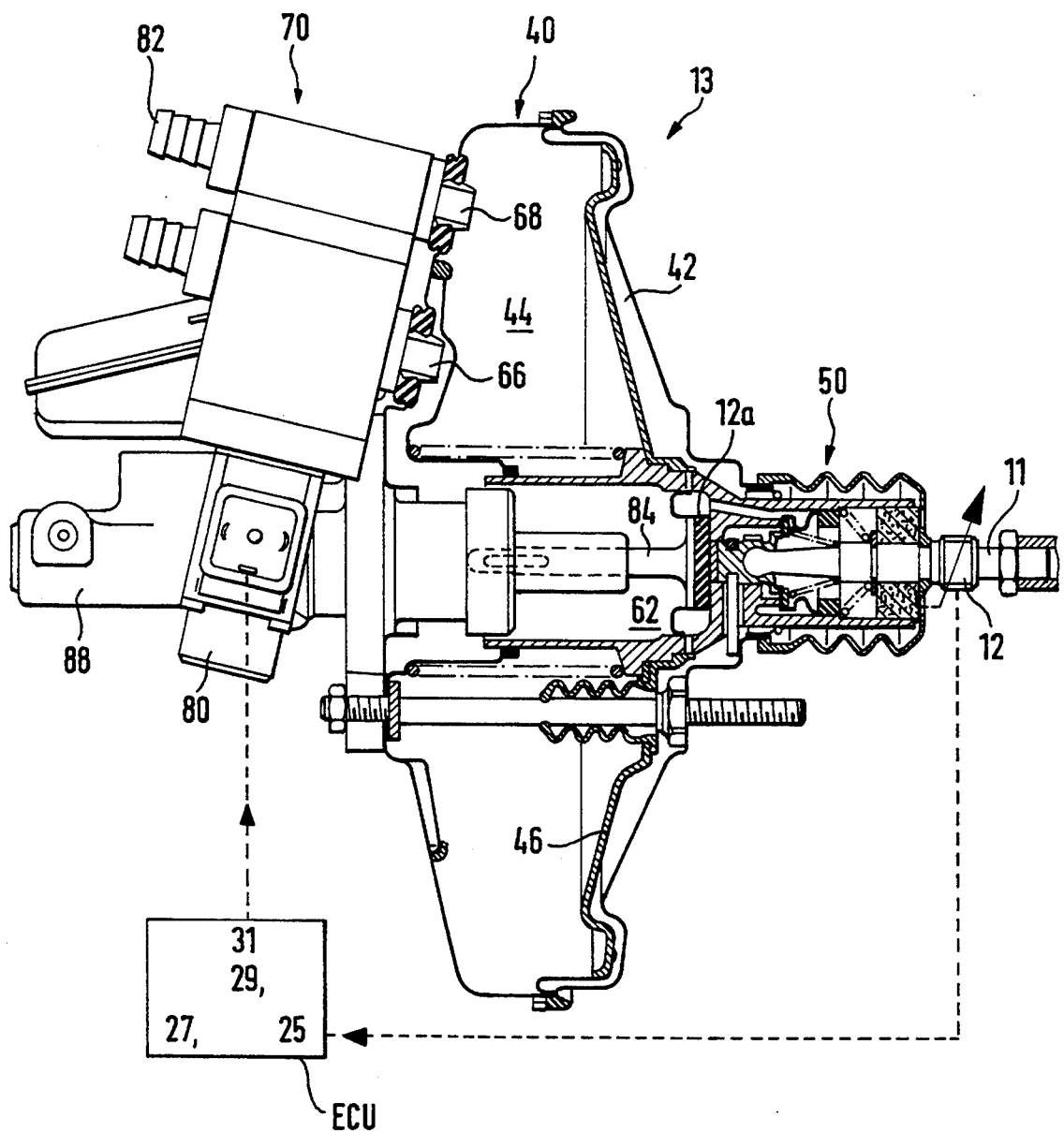
FIG. 3 illustrates the brake system of FIG. 1, with the brake pressure booster being shown in greater detail.

FIG. 3 is a detailed presentation of a brake system including a brake pressure booster which is connected according to the invention with the means for controlling the brake pressure.

The brake pressure booster 13 illustrated includes a casing 40 which is substantially rotationally symmetric and inside which a rear chamber 42 and a front chamber 44 are divided by a movable wall 46. The brake pressure booster also comprises a first controllable valve 50 connected to the movable wall 46 for joint relative movement with respect to the casing 40. The front end of a rod-shaped actuator member 11 which, in built-in condition, is connected to the brake pedal 10 of a motor vehicle acts on the valve 50.

The rear chamber 42 communicates through a check valve with a defined central space 62 inside the brake pressure booster 13 so that air from this space 62 can flow into the rear chamber 42 but cannot return. The central space 62 also communicates with a connecting member 66 which defines an opening in the casing 40 so as to admit air. Another connecting member 68 in the casing 40, operating to suck off air, is coordinated with the front chamber 44.

A second controllable valve 70 is connected to both members 66 and 68. In the embodiment shown, this valve is disposed directly at the front side of the casing 40 of the brake pressure booster and its structure is similar to that of the first controllable valve 50. The second valve 70 is controlled by an electromagnet 80 so that the front chamber 44 communicates with the central space 62 when the valve 70 is inoperative. The second valve 70 further comprises a vacuum connection terminal 82 which is in constant communication with the connecting member 68 and, therefore, also with the front chamber 44 and adapted to be connected to a source of vacuum, for example the intake air pipe of an internal combustion engine.

A power output member 84 supported on the first controllable valve 50 is arranged in the central space 62. The output member 84 is provided for actuation of the master cylinder 35.

In the inoperative condition illustrated, with the vacuum source switched off, atmospheric pressure prevails in both chambers 42 and 44. Low pressure builds up in the front chamber 44 when the vacuum source is switched on, for instance, during running of the engine with whose intake pipe the vacuum connection terminal 82 communicates so that the movable wall 46 is shifted slightly forwardly, accompanied by movement of the valve 50. Hereby the pressure once again becomes balanced between the two chambers 42 and 44. This position of readiness makes sure that from here on the brake pressure booster can be actuated without a loss distance.

When the brakes are applied normally by the driver, the brake pressure booster operates in the usual manner in that the connection between the two chambers 42 and 44 by way of the first controllable valve 50 is interrupted and ambient air flows into the rear chamber 42. As a consequence, the actuating force now available at the power output member 84 is increased by the brake pressure booster. This is true also if the electromagnet 80 is currentless and, therefore, the second controllable valve 70 remains in its position of rest, with the result that low pressure continues to prevail in the central space 62 as it does in the front chamber 44.

If the driver has caused the actuator member 11 to be moved forwardly exceptionally fast, the force sensor 12 located at the actuator member 11 emits a signal for input into a computer ECU which makes sure that the electromagnet 80 is excited and the second valve 70 actuated so that the two connecting members 66 and 68 will be separated from each other and ambient air can flow through connecting member 66 into the central space 62 and the rear chamber 42.

In any case, the air admitted through the second controllable valve 70 and on through the central space 62 into the rear chamber 42 causes rapid forward movement of the movable wall 46 together with the casing 40.

The force sensor 12 positioned, as shown, at the actuator member 11 and embodied by a strain gauge can be replaced by an alternative design force sensor such as the one illustrated in FIGS. 2, 2a which may be mounted, for example, at the location marked 12a at the front end of the actuator member 11 being supported on a rubber plate which forms part of the hydraulic transmission system.

The method described above and the apparatus by which it is realized provide favorable pressure build-up at the brake 37, especially upon very sudden and strong applications of the brake in dangerous situations, thereby overcoming errors often made in practice by the driver (and resulting in too little brake pressure). That is accomplished due to the fact that stronger brake pressure boosting is realized by the brake pressure booster 13 due to the threshold values Fv max associated with the individual force increase gradients Fv ped at the brake pedal, than is the case with conventional braking.

Hereby not only the brake pressure build-up is accelerated but also a higher brake pressure level is achieved. Conventionally an ABS system prevents the brake pressure level from becoming too high.

What is claimed is:

1. A brake pressure boosting system for control of brake pressure in a motor vehicle brake system equipped with an electronically adjustable brake pressure booster, wherein a sensor is provided to detect a braking force F ped which acts on a brake pedal and a differentiator means generating an output signal Fv ped is provided to differentiate the braking force F ped so as to detect a force increase gradient Fv ped at the brake pedal and in response thereto boost the brake pressure in such manner that, during a braking operation, respective threshold values Fv max are associated successively with respective instantaneous force increase gradients Fv ped at the brake pedal, each instantaneous value of the force increase gradient Fv ped is compared in a comparator means with the corresponding threshold value Fv max, and an output signal of the comparator means serves to control the brake pressure booster.

* * * * *